April 15, 1941.　　　F. G. PURINTON　　　2,238,865
FASTENING DEVICE
Filed May 1, 1939　　　2 Sheets-Sheet 1

Inventor.
Forrest G. Purinton
by Heard Smith & Tennant.
Attys.

April 15, 1941. F. G. PURINTON 2,238,865
FASTENING DEVICE
Filed May 1, 1939 2 Sheets-Sheet 2
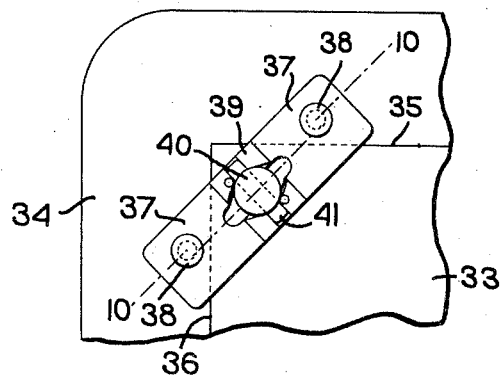
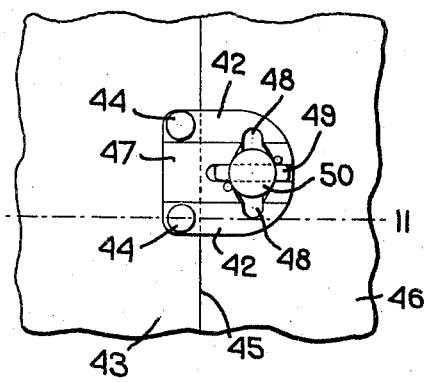
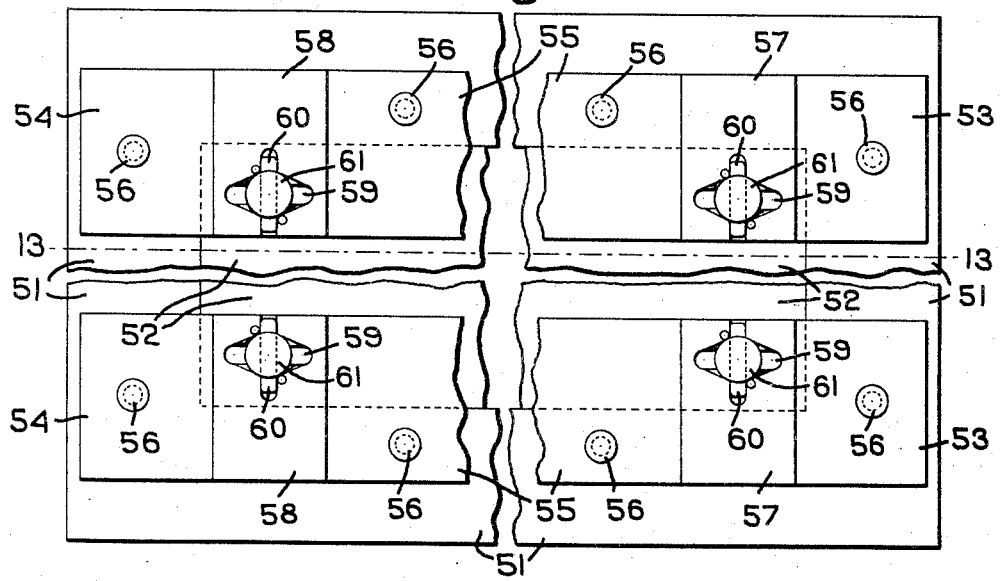
Inventor
Forrest G. Purinton
by Heard Smith & Tennant.
Attys.

Patented Apr. 15, 1941

2,238,865

UNITED STATES PATENT OFFICE 2,238,865

FASTENING DEVICE

Forrest G. Purinton, Waterbury, Conn., assignor to The Patent Button Company, Waterbury, Conn., a corporation of Connecticut Application May 1, 1939, Serial No. 271,088

3 Claims. (Cl. 24—221)

This invention relates to improvements in fastening devices for releasably and yieldably clamping together two or more overlapped or juxtaposed members.

More particularly the invention relates to improvements in fastening devices for locking together metallic plates, such, for example, as locking a cover plate for a service opening in the body of an aeroplane to the metal plate forming the body of the aeroplane. It is some times desirable to have both plates lie in the same plane, such, for example, as a cover plate for an opening in the body of a streamlined aeroplane, and a further object of the invention is to provide a fastening device which will accomplish this purpose in such manner that the streamlined contour of the exterior of the aeroplane will be unobstructed by any projecting cover plate and in which the cover plate will be so held against the body that vibration therebetween will be prevented.

The invention more particularly relates to improvements in fastening devices comprising a stud rotatably mounted in one member or plate and having at or near its end a lateral extension or cross bar and in which the other fastening member comprises a resilient keeper rigidly mounted upon the other member or plate and provided with an aperture complementary to the stud and its cross bar and so constructed that when the stud and its cross bar are inserted through the keeper and given a quarter turn a locking tension will be imposed upon the fastening device which will resiliently hold the members or plates together.

The object of the invention is to provide a fastening device of the character described in which the keeper plate may be so secured to one of the members as to overlie an aperture therein and form an abutment against which the other member or plate may seat and be rigidly secured by the rotatable stud and its cross bar in such manner that the faces of the members will lie in the same plane, this construction being particularly adapted for releasably securing a cover plate or panel within the opening of the streamlined body of an aeroplane or in a construction in which it is desired that one of the faces of the device will present an unobstructed or streamlined surface.

These and other objects and features of the invention will more fully appear from the following description and the accompanying drawings and will be particularly pointed out in the claims.

In the drawings:

Fig. 8 is a plan view of a corner of an outer member or plate having a recess in it with a closure plate fitting the recess and held in locked position therein by a keeper plate extending across the corner of the opening and engaged by a stud and cross bar mounted in the closure plate the construction being such that the outer plane of the plate and its closure lie in the same plane;

Fig. 9 is a view of two members abutting edge to edge and locked together by a keeper plate fixedly mounted upon one of said members and extending beyond the edge thereof, said keeper plate being engaged by a stud mounted in the other member having a cross bar engaging the keeper plate;

Fig. 10 is a sectional view on line 10—10, Fig. 8, the stud and cross bar being shown in elevation;

Fig. 11 is a sectional view on line 11—11, Fig. 9;

Figure 1:
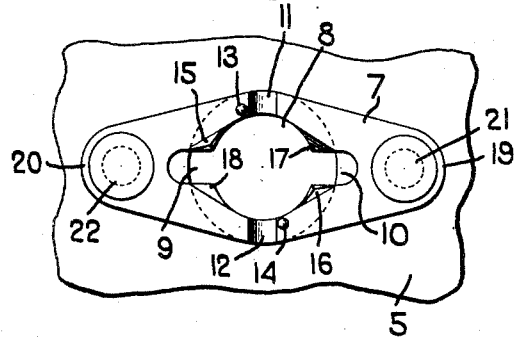
Fig. 1 is a plan view of one of two members which are to be secured together having secured thereto a preferred form of keeper plate forming part of the invention.
Figure 2:
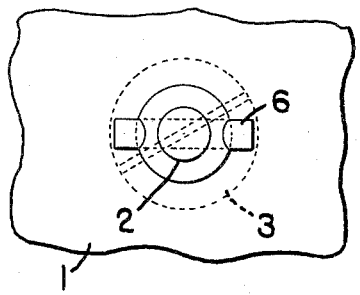
Fig. 2 is a plan view of another plate which is adapted to be secured to the plate illustrated in Fig. 1 showing in full lines the end of the stud and its cross bar and in dotted lines the head of the stud which engages the other side of the plate.

Fig. 12 is a plan view of a construction, centrally broken away in both directions, in which the present invention is employed resiliently to lock a large panel in a complementary opening in a plate in such manner that the assembled plates will present a smooth continuous surface, the construction being such that the material cut from the larger plate may be employed as the closure panel for the opening formed therein; and, Fig. 13 is a sectional view on line 13—13, Fig. 12.

Preferred embodiments of the invention are illustrated in the accompanying drawings as applied to flat plates adapted to be secured together in superimposed relation, in edge to edge relation, or where one plate fits into a complementary aperture in the other plate, with said plates presenting surfaces in the same plane.

In each of the constructions illustrated the fastening means comprises a stud which is rotatably journaled in one of the members or plates with a head to engage the plate and a shank adapted to extend through an aperture in the other member and provided with a cross bar adapted to engage the keeper mounted upon the other member.

The invention is illustrated in Figs. 1 to 7 inclusive in forms for securing two superimposed or overlapping plates together. One of the plates 1, which may for convenience be termed a "cover plate" has rotatably mounted in it a stud 2 having an enlarged head 3 adapted to engage one surface of the plate and which extends through an aperture 4 in another plate 5 which may be termed a "main plate," such as the body of an aeroplane, or sheet metal wall of a casing receptacle or other device. The stud 2 is provided near its free end with a transverse bore in which is fixedly secured a cross bar or pin 6 the ends of which project beyond the shank of the stud, but are of such length as to pass through the aperture 4 when the plates 1 and 5 are brought together.

A resilient keeper, which is fixedly secured to the main plate 5, cooperates with the pin and its cross bar to lock the members together when the stud has been inserted through the main plate 5 and given a quarter turn.

I am aware that resilient keepers of sheet metal and of wire have been heretofore employed to cooperate with the cross bars of locking studs of the character described, but the present invention differs therefrom in that it is so constructed as to provide means to engage the cross bar of the stud to prevent rotation in one direction and with means for guiding the cross bar into locking position when rotated in the other direction. It also comprises means to engage the cross bar when the stud is rotated preferably through an angle of ninety-degrees, with means for positively preventing such further rotation of the stud as would be likely to release the locking engagement between the cross bar of the stud and keeper. The features above described are common to all the species of the invention which are illustrated in the drawings.

In the constructions illustrated in Figs. 1 to 7 the keeper is preferably a flat plate 7 of suitable resilient metal and desirably is generally of diamond shape. The central portion of the keeper plate is provided with a circular aperture 8 with recesses 9 and 10 extending from the aperture of the plate longitudinally of the keeper forming a keyhole slot, the aperture 8 and recesses 9 and 10 being of such size as to permit the stud and its cross bar to pass therethrough with any desirable clearance.

The keeper plate is provided preferably at its widest portion with diametrically opposite downwardly curved sockets 11 and 12 to receive the ends of the cross bar 6 when the stud has been inserted through the aperture 8 and rotated through an angle of ninety-degrees. In the construction illustrated bosses 13 and 14 are built up or struck up from the keeper plate 7 at diametrically opposite positions just beyond the sockets 11 and 12, thereby to engage the cross bar of the stud and prevent the stud from being rotated beyond locking position.

In each of the constructions illustrated the central portion of the keeper plate is so constructed and so spaced from the member to which it is attached that when the shank of the stud is passed through the aperture 4 and the members 1 and 5 brought together, the stud will be prevented from rotating in one direction such as a counter-clockwise direction. This may be accomplished by so spacing the keeper plate from the member to which it is attached that its central portion will lie above the horizontal plane of the axis of the cross bar 6 of the stud, but preferably the prevention of rotation of the stud in such undesirable direction is insured by bending upwardly or outwardly diametrically opposite sections 15 and 16 of the walls of the recesses 9 and 10 at their junction with the periphery of the aperture 8.

In order to enable the stud to be rotated in a locking direction, preferably a clockwise direction, the keeper plate 7 is provided at diametrically opposite points with downwardly inclined ramp portions 17 and 18 at the junction between the walls of the recesses 9 and 10 and that of the aperture 8. When therefore the stud is rotated in a clockwise direction the ends of the cross bars 6 will engage the ramps 17 and 18 and as the stud is rotated will ride up upon said ramps, thereby forcing the central portion of the keeper downwardly so that the keeper will exert a progressively increasing elastic force upon the stud until the stud is rotated to the position in which the ends of the cross bar 6 drop into the locking sockets 11 and 12 of the keeper.

Figure 3:
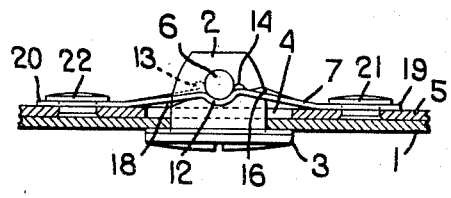
Fig. 3 is a view mainly in central longitudinal section of the plates shown in Figs. 1 and 2 superimposed in assembled position with a stud extending through the keeper and the cross bar engaging the keeper in locked position.

In the construction shown in Fig. 3 the central portion of the keeper 7 inclines upwardly from its end portions 19 and 20, which are respectively secured to the member or plate 5 by rivets 21 and 22 to the locking sockets. When the stud is rotated in a locking direction the cross bar 6 of the stud rides up the ramps 17 and 18, thereby exerting a toggle-like action upon the oppositely inclined central portions of the keeper. Inasmuch as the ends of the keeper are rigidly and immovably secured to the plate 5 any load upon the resilient keeper will tend to put the material of the keeper under compression and the greater the load the greater compression and resistance to deflection.

One of the objects of the invention is to provide a construction in which the movement of the stud to locking position will not put the metal of the keeper under compression or increase the resistance to deflection by the increase in load, but upon the contrary will enable the material of the keeper to be placed under tension as the stud is rotated to and maintained in locking position.

Various forms of construction which embody this feature of the invention are illustrated in Figs. 4, 5, 6, and 7. In the construction illustrated in Fig. 4 the keeper 7 is in the form of a flat plate of general diamond-shaped contour as illustrated in Fig. 1, but the relatively narrow end portions 23 are reversely bent beneath the body of the plate so that these end portions 23 provide spacers to engage the main plate or member 5. Rivets 24, which are seated in the plate 5, pass through suitable holes in the inturned ends 23 and the body of the keeper 7 and rigidly secure the ends of the keeper to the plate 5, so that its body is narrowly spaced away from the adjacent surface of the plate 5. When the members 1 and 5 are brought together and the stud 2 passed through the aperture 4 in the plate 5 and the stud rotated in a clockwise direction, the stud 6 will ride up the ramps 17 and 18 thereby depressing the central portion of the keeper 7 and placing it under tension as the stud is moved toward and retained in locking position.

In such case the deflection of the plate 7 to provide proper resilient locking engagement may be much less than in the construction illustrated in Fig. 3. Furthermore if greater spring action is required a thicker or heavier stock may be employed than would be possible in the construction shown in Fig. 4, in which the resistance to the toggle-like action is progressively increased in accordance with the thickness or strength of the resilient plate.

Figure 4:
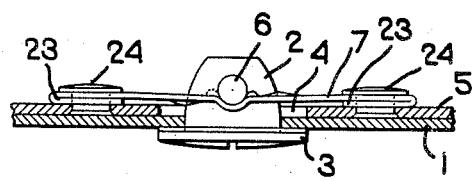
Fig. 4 is an illustration of a modified form of the invention in which the keeper plate is substantially flat and is provided with inturned end portions secured to one of the plates by rivets passing through the plate and the inturned end portions.

Furthermore, in the construction illustrated in Fig. 4, the keeper plate may be brought much nearer to the main plate 5, thus reducing the length of the projection which is greatly advantageous where the keeper plate is mounted, for example, upon an engine cowling, as a mechanic working through the panel opening will be less liable to catch his clothing on the stud or the flat spring.

Figure 5:
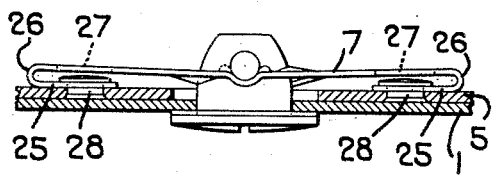
Fig. 5 is an illustration of another modified form of the invention in which the keeper plate is flat and substantially parallel to the member to which it is attached and is provided with inturned end portions spaced from the body of the keeper plate and secured by rivets to the member to which it is attached.

Another modification of the invention is illustrated in Fig. 5, in which the keeper 7 is in the form of a flat resilient plate having inturned ends 25 which, however, instead of being folded against the under face of the keeper plate 7 are spaced therefrom to present a looped end portion 26 adapted to give the keeper plate greater resilience when placed under tension. In this construction the keeper plate is provided near the inturned ends with apertures 27 of sufficient size to permit access to rivets 28 which secure the inturned ends of the keeper plate to the main plate 5. In all other respects this construction embodies the distinctive features of the invention above described to which the same numerals are applied.

Figure 6:
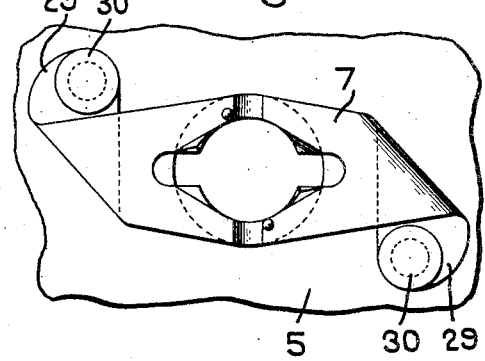
Fig. 6 illustrates another modification of the invention in which the ends of the keeper plate are not only inturned but reversely turned so that the rivets which secure them to the member lie outside of the central area of the keeper plate.

Another modified form of the invention is illustrated in Fig. 6 in which the inturned end portions 29 of the keeper plate instead of being bent back directly under the body portion are twisted in angular relation to the longitudinal axis of the keeper plate, thereby so exposing the inturned ends as to enable free access to the rivets 30 by which the keeper plate is secured to the main plate or member of the assemblage. In this construction the central portion of the keeper plate preferably is flat and disposed in parallelism to the main plate or member 5 and is spaced apart therefrom a desirable distance as indicated in Fig. 5.

Figure 7:
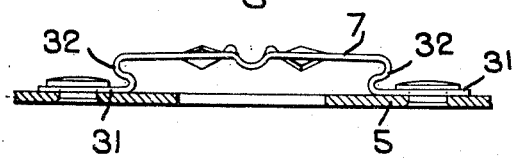
Fig. 7 is another modified form of the invention in which the central portion of the keeper plate is spaced apart from the member to which its ends are attached by reversely curved portions located in proximity to the anchored ends.

Another specific embodiment of the invention is shown in Fig. 7 in which the ends 31 of the keeper plate are reversely bent in two directions so that the central flat portion of the keeper plate is connected to and offset from the end portions 31 by S-shaped or ogee-shaped sections 32.

In this construction the tensile force which is exerted upon the central flat portion of the keeper when the stud and its cross bar are turned to locking position is partially absorbed by the resilience of the S-shaped sections 32. As a consequence this construction can be employed where a minimum elastic force is necessary to hold the members in locked position, or conversely a much heavier or stiffer locking keeper may be employed than in the previous constructions.

Preferred embodiments of the invention are illustrated in Figs. 8, 9, 10, 11 and 12 of the drawings, as applied to a stream line construction in which a panel or filler plate 33 is locked in closed position within a complementary aperture in a main plate 34. The construction shown in Fig. 8 illustrates one corner of a rectangular main plate 34 having a rectangular area bounded by lines 35 and 36 cut out of its central portion with the closure plate 33 closely fitting the opening and lying in the same plane therewith as illustrated in Fig. 10. Keeper plates are secured diagonally across the corner areas of the aperture. These keeper plates are of resilient metal having flat end portions 37 which are secured to the plate 34 by rivets 38 or in any other suitable manner. The central portion of the keeper plate comprises an arch-shaped section 39 which is integral with and extends upwardly from the plane of the end portions 37 and is so constructed as to embody the distinctive features of the keepers above described, including the socket to receive the cross bar of the stud, the upturned wall to prevent rotation of the stud in one direction, the ramp to cause rotation of the stud in a direction to lock the parts together, and the abutments for preventing rotation of the stud beyond locking position.

The locking stud 40 having a cross bar 41 is rotatably mounted in the corner portion of the closure plate 33 and the stud and its cross bar are adapted to pass through complementary recesses in the central portion 39 of the keeper plate and rotated to locking position in the manner above described. Obviously any of the forms of keepers shown in Figs. 1 to 7 may be adapted for use with the locking studs and their cross bars for clamping and locking a panel in an opening in a main plate as well as for use in locking together two superimposed plates.

Any suitable number of locking devices of this character may be employed properly to hold the closure plate 33 releasably in locked position. It will be noted that in this embodiment of the invention the end portions 37 of the keeper plate extend over the aperture in the main plate 34 sufficiently to form a backing for the closure plate so that the opposite face of the closure plate will lie in the same plane as the corresponding face of the main plate 34.

Another adaptation of the invention is shown in Figs. 9 and 11 as securing two similar plates together in edge to edge relation. In this construction the keeper plate is formed of flat resilient metal having flat end portions 42 which are secured to a main plate 43 by rivets 44 in such manner that the keeper plate extends beyond the line 45 which represents the edge of the main plate against which the edge of a complementary plate 46 abuts. The central portion 47 of the keeper plate is arched upwardly from its end portions 42 and is provided with a central circular stud-receiving aperture and communicating recesses 48 through which the cross bar 49 of a stud 50 may be inserted. Preferably these recesses extend transversely of the length of the keeper plate and may be of such length as to project into the flat end portions 42 of the keeper plate. In this construction as in those previously described the diametrically opposite walls of the aperture are respectively so formed as to prevent rotation of the locking stud in one direction and to provide oppositely disposed ramps for engagement by the cross bar of the stud when rotated in the opposite direction, as heretofore described.

Another embodiment of the invention is illustrated in Figs. 12 and 13 which may be employed when a main plate 51 of large size is provided with a large opening adapted to be closed by a closure plate or panel 52 seated within said opening and presenting a surface flush with that of the main plate. In this construction the keeper plates are in the form of long strips of resilient metal having end portions 53 and 54 and a central portion 55 all lying in the same plane and secured to the main plate 51 at suitable intervals as by rivets 56. Intermediate portions 57 and 58 of the resilient keeper plate located at desirable distances from each other are bent upwardly or offset from the ends and central portion and are provided with apertures and communicating slots 59 forming keyhole slots to receive the cross bars 60 of studs 61 which are rotatably mounted in the closure plate 52.

These keeper plates are so secured to the main plate 51 as to overlie suitable portions of the large aperture in the plate 51 so that locking studs suitably mounted in the closure plate or panel 52 will cooperate with the offset apertured portions of the keeper plate. In this construction the ends 53 and 54 of the keeper plate preferably will overlie the end portions of the aperture in the main plate 51 and together with the central portion 55 form a backing for the closure plate or panel 52 which will hold the opposite surface of the panel in the same plane as that of the corresponding surface of the main plate 51. The offset portions of the keeper plate embody the same features of construction with respect to preventing rotation of the locking stud in one direction and for placing the resilient offset portions of the locking plate under tension when the stud is rotated to locking position and the means for preventing rotation of the stud beyond locking position as has heretofore been described.

The constructions illustrated in Figs. 8 and 10, and 12 and 13, are particularly advantageous in the manufacture of aeroplane parts and the like for the reason that it enables the panel of any size or contour to be cut by a suitable thin tool from the main plate and afterwards employed as a closure for the aperture thus formed.

It will be understood that the several embodiments of the invention shown and described herein are of an illustrative character and are not restrictive of the meaning and scope of the following claims.

Having thus described the invention, what is claimed as new, and desired to be secured by Letters Patent, is:

1. Releasable means for fastening to a main plate of sheet material having an aperture therethrough a panel of sheet material fitting said aperture, with the edges of said plate and panel in edge to edge abutting relationship, and with the outer surfaces of said plate and panel in the same plane, comprising an integral separately formed keeper attached to the rear of said main plate and extending beyond the edge of said aperture over a portion of the area to be covered by the panel and providing a stop against which said panel may be clamped, said keeper having an offset resilient portion spaced from said panel when the latter is in position against said keeper, a locking stud rotatably mounted in said panel, and cooperating interengaging means on said stud and the resilient portion of said keeper operable to lock said panel firmly against said keeper upon partial rotation of said stud.

2. Releasable means for fastening to a main plate of sheet material having an aperture therethrough a panel of sheet material fitting said aperture with the edges of the plate and panel in edge to edge abutting relationship and with their outer surfaces in the same plane, comprising an integral separately formed keeper extending across a portion of the area of said aperture and fixedly secured at its ends to the rear face of said main plate to provide a stop against which the panel may be clamped, said keeper having an intermediate offset resilient portion provided with a keyhole slot spaced from the panel when the latter is in position against said keeper, a locking stud rotatably mounted in said panel having a cross bar in its end of greater length than the diameter of the stud adapted to be inserted through said keyhole slot, and interengaging means on said stud and the resilient portion of said keeper operable to lock the panel firmly against said keeper upon partial rotation of said stud and to prevent reverse rotation of said stud.

3. Releasable means for fastening to a main plate of sheet material having an aperture therethrough a panel of sheet material fitting said aperture with the edges of said plate and panel in edge to edge abutting relationship and with their outer surfaces in the same plane, comprising an integral separately formed keeper plate attached to the rear face of said main plate and extending diagonally across a corner portion of said aperture and secured at its end to said main plate providing a stop against which the panel may be clamped, said keeper plate having an intermediate offset resilient portion provided with a keyhole slot spaced from said panel when the latter is in position against said keeper, a locking stud rotatably mounted in said panel having a head engaging the outer face of said panel and having a transverse cross bar extending through the upper end of said shank adapted together with the end of said stud to be inserted through the keyhole slot in said keeper, the resilient portion of said keeper having means operable upon rotation of said stud to draw said panel firmly against said keeper and having means to prevent rotation of said stud and thereby to lock the panel firmly against vibration or displacement.

FORREST G. PURINTON.